Figure 2:
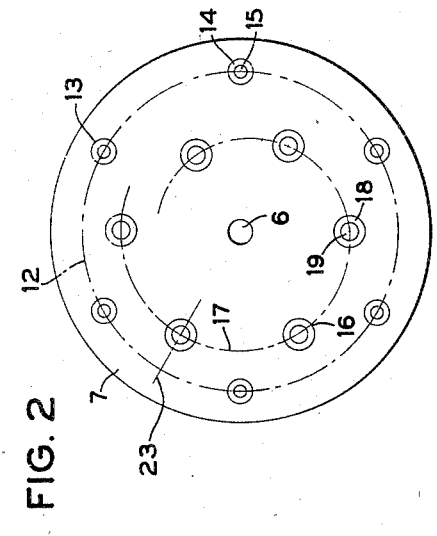

Feb. 18, 1958   E. F. W. MOELTZNER ET AL   2,823,831
WORK FEEDING MECHANISM
Filed May 20, 1954

INVENTOR
ERNST FRITZ WILHELM MOELTZNER
JOHANN HÜBL
BY Strauch, Nolan & Diggins
ATTORNEY

United States Patent Office 2,823,831
Patented Feb. 18, 1958

2,823,831

WORK FEEDING MECHANISM

Ernst Fritz Wilhelm Moeltzner, Berlin-Charlottenburg, and Johann Hubl, Berlin-Halensee, Germany, assignors, by mesne assignments, to Landis Machine Company, Waynesboro, Pa., a corporation of Pennsylvania Application May 20, 1954, Serial No. 431,166

Claims priority, application Germany June 6, 1953

6 Claims. (Cl. 221—184)

The invention is directed to a mechanism for feeding pin-shaped work pieces made entirely or partly of magnetic material and which may be provided with a shoulder, preferably in machine tools, thread rolling machines in particular, by means of magnets mounted in a disc or the like which rotates in a vertical plane. These magnets lift the work pieces out of a hopper and deliver them automatically to an inclined feed chute, especially one provided with a guide slot, and is an improvement upon the subject matter of copending application Serial No. 326,199 filed December 16, 1952, for Device for Feeding Work Pieces. In accordance with said copending application the magnets, preferably permanent pot-shaped magnets, are mounted with their poles in the plane of the side face of the disc. Furthermore, an operative scoop mechanism is provided in the plane of the disc, which necessitates a special control mechanism for producing an oscillating motion.

The object of the invention is to simplify the feeding mechanism and to reduce the price thereof, which is done by using magnets positioned with their poles in the side face of the disc for the scoop mechanism. It has been discovered that the mechanically controlled scoop mechanism is unnecessary, if sufficiently strong scoop magnets are employed in addition to the feeding magnets. Accordingly, the invention resides in the fact that additional magnets, preferably permanent pot-shaped magnets, disposed with their poles in the plane of the side face of the disc serve in lieu of a mechanically controlled scoop mechanism and lie inside of the circular path on which the magnets used for feeding are arranged. These additional agitating magnets pass without obstruction through the heap of work pieces in the hopper and loosen it, so that the feeding magnets can seize the separated work pieces.

A preferable embodiment of the invention is one in which the agitating magnets lie on a spiral path which rises in the direction of rotation of the disc wherein each agitating magnet is advantageously arranged on the spiral path about on the center line between two feeding magnets. Preferably, the agitating magnets have larger poles than the feeding magnets so that they can perform the loosening operation even when the work pieces are clogged. In contrast to the feeding magnets, the agitating magnets do not have the task of introducing the work pieces which they pick up into the feed chute. Rather, the work pieces should fall back into the hopper. For this reason a stripper member is mounted closely in front of the side face of the disc and across the spiral path. Preferably, the guide plate mounted on the feed chute at the upper end thereof within range of the feeding magnets, is formed as a stripper for the agitating magnets.

Figure 3:
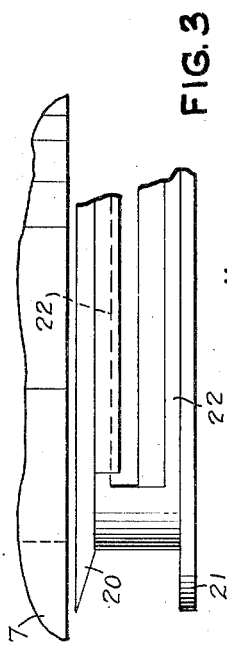
Figure 1:
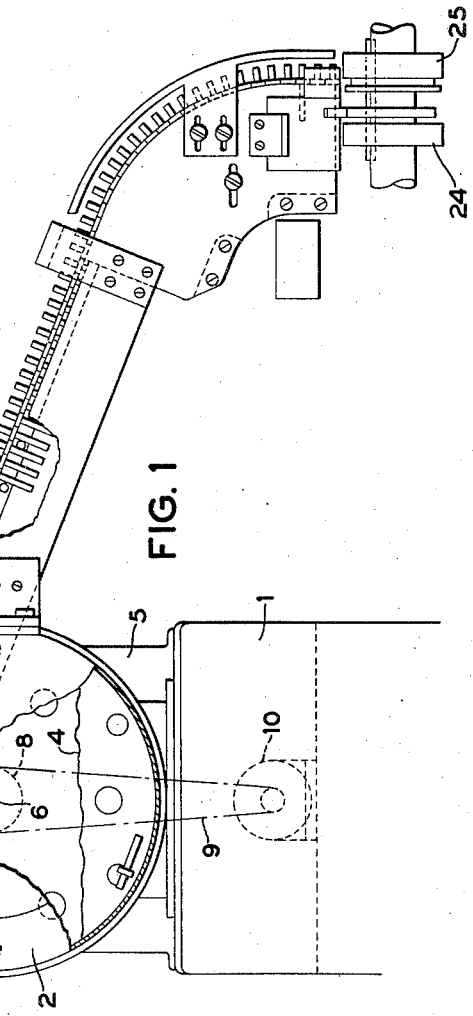

The subject matter of the invention is shown in the drawing in an exemplary embodiment. In the drawing, Figure 1 is a side elevation of the feeding mechanism with the magnetic scoop mechanism;

Figure 2 shows the feeding and agitating magnets which are disposed in the side face of the disc; and Figure 3 is a fragmentary top plan view of the apparatus of Figure 1 showing details of construction.

The frame 1 supports the hopper 2 which is shown partly cut away and which is filled with work pieces 3 to the line 4. A bearing block 5 is secured on the frame and the shaft 6 of the disc 7 is journalled in the bearing block 5. The driving sheave 8 for the disc 7 is driven by an electric motor 10 mounted in the frame 1, via the belt 9. The direction of rotation of the disc is indicated by the arrow 11. The feeding magnets 13, formed as pot-shaped magnets, lie on the circular path 12 and have the poles 14 and 15. Inside the circular path 12, the agitating magnets 16 lie on the spiral path 17. They are likewise formed as permanent pot-shaped magnets and have the poles 18 and 19. Like the feeding magnets, they lie with these poles in the plane of the side face of the disc, which is preferably made of a light metal alloy and its front is covered with a disc of pressed fibrous material, as is described in the aforesaid application Serial No. 326,199.

A stripper 20 is mounted to lie closely adjacent the face of the disc 7 and in the spiral path 17. This stripper 20 is integral with the guide plate 21 which is secured to the upper end of the feed chute. The work pieces removed from the heap by the agitating magnets push against the stripper 20 and fall back into the hopper so that they remain constantly loose. The feeding magnets 13 take up work pieces principally from the top of the heap and arrange them in the feed chute 22. In order that the work pieces cling to the feeding magnets and the agitating magnets shall not get in each others way, the agitating magnets are disposed on the spiral path 17 approximately on the center line 23 between each two feeding magnets 13. A circular path, having a diameter smaller than the circular path 12 for the feeding magnets, may also be provided for the agitating-magnet arrangement instead of the spiral path. Other arrangements of the agitating magnets are also possible. For example, they can be offset from each other in zigzag or wave arrangement, within the circular path 12, in such a way that all of the agitating magnets are passed through the heap of work pieces. The cross-sectional area of the agitating magnets and their pole surfaces is greater than that of the feeding magnets, as is evident from the drawing.

The fed work pieces are delivered by the feed chute to the working station which is represented by the rolling tools 24, 25.

The advantage of the magnetic agitating mechanism resides in a substantial simplification of the entire apparatus. It makes possible an easy and constant loosening of the heap of work pieces, without jamming, and without the possibility of locking or stopping the scoop mechanism. The constant feed of work pieces to the feed chute is thereby improved.

We claim:

1. Mechanism for removing magnetizable work pieces from a hopper and delivering them to the end of a feed chute mounted above said hopper comprising, a disc arranged to rotate in a substantially vertical plane and bridging the space between said hopper and said end of said chute, a set of feeding magnets mounted on said disc with their poles substantially in the plane of a side face of the disc, said magnets being arranged on a substantially circular path to pass through said hopper and above the end of said chute upon rotation of said disc, a set of agitating magnets mounted on said disc with their poles substantially in the plane of said face of said disc and arranged inwardly of said feeding magnets, and a member mounted above said hopper in the path of work pieces carried by said agitating magnets to strip work pieces therefrom whereby work pieces picked up by said agitating magnets are returned loosely to said hopper to facilitate their subsequent pickup by said feeding magnets for delivery to said chute.

2. The mechanism according to claim 1 wherein said member is provided with operative surfaces effective to force said work pieces from certain of said agitating magnets radially outwardly into the path of said feeding megnets.

3. The mechanism according to claim 1 wherein the agitating magnets are disposed on a spiral path which rises in the direction of rotation of said disc.

4. The mechanism according to claim 1 wherein each agitating magnet is disposed on a radius equidistant from radii containing adjacent feeding magnets.

5. The mechanism according to claim 1 wherein the agitating magnets have larger poles than the feeding magnets.

6. Mechanism for moving magnetizable work pieces from a hopper and delivering them to the end of a feed chute mounted above said hopper comprising, a disc arranged to rotate in a substantially vertical plane and bridging the space between said hopper and said end of said chute, a set of feeding magnets mounted in said disc with their poles substantially in the plane of a side face of the disc, said magnets being arranged on a substantially circular path to pass through said hopper and above the end of said chute upon rotation of said disc, a set of agitating magnets mounted in said disc with their poles substantially in the plane of said side face of said disc and arranged inwardly of said feeding magnets, and a member mounted adjacent said end of said chute and having an operative surface extending into the path of work pieces carried by said agitating magnets to strip work pieces therefrom whereby pieces picked up by said agitating magnets are returned loosely to said hopper to facilitate their subsequent pick-up by said feeding magnets for delivery to said chute, said member having an additional operative surface effective to guide work pieces carried by said feeding magnets into said chute.

References Cited in the file of this patent

UNITED STATES PATENTS

| | | |
|---|---|---|
| 259,996 | Bennett | June 27, 1882 |
| 315,028 | Hilder et al. | Apr. 7, 1885 |
| 1,094,776 | Brinkman | Apr. 28, 1914 |
| 1,358,725 | Gaynor | Nov. 16, 1920 |

U. S. DEPARTMENT OF COMMERCE
PATENT OFFICE

CERTIFICATE OF CORRECTION

Patent No. 2,823,831 February 18, 1958

Ernst Fritz Wilhelm Moeltzner et al.

It is hereby certified that error appears in the printed specification of the above numbered patent requiring correction and that the said Letters Patent should read as corrected below.

Column 4, line 12, before "pieces" insert --work--.

Signed and sealed this 6th day of May 1958.

(SEAL)
Attest:
KARL H. AXLINE
Attesting Officer

ROBERT C. WATSON
Commissioner of Patents